United States Patent Office 3,561,945
Patented Feb. 9, 1971

3,561,945
METHOD FOR CONTROLLING THE GROWTH OF ALGAE
Robert W. Kilburn, Lake Wales, Fla., assignor to Aqua Klear, Inc., Lake Wales, Fla.
No Drawing. Continuation-in-part of application Ser. No. 505,017, Oct. 24, 1965. This application July 8, 1968, Ser. No. 743,019
Int. Cl. A01n *11/00*
U.S. Cl. 71—67          5 Claims

ABSTRACT OF THE DISCLOSURE

A method of controlling the growth of aquatic plants such as algae in water by dispersing finely divided alumina therein thereby adsorbing the dissolved phosphate contained in the water which is necessary to the growth of algae.

---

This application is a continuation-in-part of my copending application Ser. No. 505,017, filed Oct. 24, 1965, now abandoned.

BACKGROUND OF INVENTION

This invention relates to a method of controlling the growth of photosynthetic plants and more particularly to the control of the growth of aquatic plant species such as algae.

The uncontrolled growth of aquatic plants such as algae in canals, ponds and streams has become an unsightly nuisance and a health hazard due to the protection they afford disease carrying mosquitoes and other insects. Also, water shortages have developed in heavily populated areas due to the contamination of water resources by the growth of algae, pond scums, troublesome weeds, such as hyacinths, duckweed, moss and other aquatic plants. The growth of these aquatic plants is also a nuisance in swimming pools, cooling towers, and in many other applications where water is used. Moreover, those obnoxious aquatic plants may retard the flow of water in drainage and irrigation canals by as much as 90 percent. Underwater mowing is ineffectual and cutting to remove these obnoxious plants is an expensive and never ending maintenance problem.

This ungoverned, wild growth of aquatic plants results in the continuous manufacture of organic compounds by photosynthesis thereby creating an ever increasing degree of pollution because, as these plants die and decay, they form a muck at the bottom of a body of water.

Three essential and major chemical nutrient elements, i.e., nitrogen, phosphorus and potassium are released by this muck which operate to further stimulate and propagate the growth of the aquatic plants.

Of the three aforementioned essential plant nutrients, potassium is mainly derived from organic material introduced into water as discarded food waste. This has been greatly accelerated by the advent of grinding garbage disposal units now widely used in homes. The digestion of this ground up garbage leaves a high residue of nutrient elements. Nitrogen compounds in streams and lakes are most commonly derived from domestic sewage. The supply of phosphates in water bodies has rapidly increased in recent years through the wide-spread use of phosphates in industry, in domestic detergents, and in chemical fertilizers.

Previous methods of attempting to control these troublesome aquatic plants include processes using poisonous substances or chemicals which have a dangerous toxic effect on man, fish and wildlife. Those methods using herbicides are ineffective, troublesome, economically unfeasible, and cannot be employed where the water is to be used for domestic purposes. Expensive special dragline buckets have been used to partially remove floating and submerged water weeds.

Diesel oil, kerosene, mineral spirits and aromatic unsaturated hydrocarbon solvents have been used to control the growth of aquatic plants but they are unsatisfactory and are dangerous fire hazards because of their low flash points. Furthermore, they are toxic to wildlife.

The use of pesticides and their manufacture is causing a high degree of pollution of waterways and renders the water so toxic as to be unfit for domestic purposes. In any event they are unsatisfactory and uneconomical for destroying aquatic weeds.

The employment of substances which destroy the aquatic plants such as toxic 2,4-D, give only temporary relief. Their application must be repeated because new growth is continuously being encouraged by the release of nutrients to new plants from the decomposed muck of the destroyed plants.

An object of the present invention is to provide a simple and inexpensive method of controlling the growth of aquatic plants, particularly algae which eliminates the necessity for employing toxic herbicides, etc.

Another object of the invention is to control and/or destroy floating and submerged aquatic plants by rendering essential nutrient chemical elements ineffective and unavailable.

Another object is to control and reduce the growth and propagation of photosynthetic aquatic plants by binding one of the essential nutrient elements to render it unavailable to these plants.

SUMMARY OF INVENTION

The invention comprises a method for controlling the growth and propagation of aquatic plants, particularly algae, in bodies of water which contain dissolved phosphate by forming an intimate admixture of finely divided alumina with said body of water, the amount of alumina being sufficient to adsorb the dissolved phosphate and reduce its concentration as phosphorous in the body of water to less than about 0.09 part per million.

It is to be understood that for the purposes of the present invention by the phrase, "forming an intimate admixture of finely divided alumina with water," is meant the direct mixing of alumina with water and/or the formation of alumina in the water in situ.

In accordance with the present invention, the dissolved phosphate contained in the water which is essential for the growth and propagation of such aquatic plants as algae is adsorbed and bound by the alumina thereby rendering it unavailable to the plants. In other words, by the process of the present invention the aquatic plants are eliminated by starvation. By removing the finely divided alumina containing adsorbed phosphate, preferably following coagulation, the phosphate is eliminated from the water altogether.

It will be apparent to those skilled in the art that the method of the present invention constitutes an improvement over the aforementioned prior art methods for controlling the growth and propagation of aquatic plants. Thus, the need for toxic and dangerous herbicides is eliminated. Expensive and time-consuming mechanical operations to physically remove the plants are not required. The use of highly inflammable and toxic substances such as kerosene, etc., is eliminated by the process of the present invention.

DETAILED DESCRIPTION OF THE INVENTION

It has been found that the minimum concentration of phosphates in a body of water which will support the growth and propagation therein of aquatic plants such as algae is about 0.09 part per million. By the process of the present invention, the concentration of free and available phosphate is reduced to less than 0.09 part per million, thereby having the effect of starving the aquatic plants.

As mentioned above, the intimate admixture of alumina and water may be formed either by the direct addition to water of alumina or by the formation of alumina in the water in situ.

Aluminum trihydrate, gelatinous aluminum hydroxide, sodium aluminate, and potassium aluminate may be added to neutral or slightly acidic water to form the alumina-water mixture. Normally, the pH of the water should preferably be between 6 and 8 for best efficiency during the above operations.

Water bearing aquatic photosynthetic plants such as algae may be treated with the above or equivalent compounds in many ways. Water with a phosphate content of less than one part in ten million was obtained by passing a solution containing 16 parts per million of phosphate through a bed of alumina trihydrate four inches thick. Residual phosphate in a solution was reduced to three parts per billion by mixing sodium aluminate, at a level of ten parts per million, into a phosphate solution, followed by the addition of aluminum sulfate at a level of ten parts per million. Water slurries of the compounds may be added to a water stream or sprayed and/or agitated into a body of water containing the aquatic weed growths.

It is not necessary to remove all of the various essential nutrients to control plant growth. The absence of one will prevent plant growth. Thus it is apparent that the fertility of the aquatic plant can be regulated by the degree of treatment. Accordingly, sufficient amounts of phosphates can be left in solution to grow sufficient plant life to feed fish and other forms of life present in the water.

The following methods may be employed to form the intimate admixtures of water and alumina:

(1) Alumina may be dispersed in water by forming an intimate admixture of aluminum hydroxide with the body of water to be treated. Aluminum hydroxide dehydrates slowly at a pH of about 6.5 to yield alumina. Thus, by this method an intimate admixture of finely divided alumina and water may be formed.

It should be noted here that gelatinous aluminum hydroxide will physically entrap particles suspended in water such as algae. The problem of aquatic plant regrowth is not completely eliminated, however, since nutrient materials, such as dissolved phosphate which will stimulate regrowth of these plants is still contained in the water.

While it is true that aluminum hydroxide will react to some extent with disolved phosphate to form an insoluble precipitate of aluminum phosphate, it is impossible to reduce the concentration of dissolved phosphate to less than about 1 part per million by this method. This is far above the minimum phosphate concentration necessary to support the growth and propagation of aquatic plants.

By permitting the aluminum hydroxide to slowly dehydrate to alumina and allowing adsorption of the dissolved phosphate, the concentration of the latter may be reduced below the minimum level of 0.09 p.p.m.

(2) The admixture of alumina and water may be formed by the direct addition of alumina to water. Alumina is commercially available as the tri-hydrate. By adding the alumina tri-hydrate to the water in a finely divided form and vigorously agitating the mixture, a colloidal dispersion of alumina and water may be obtained.

(3) The water-alumina mixture may also be formed by adding an alkali metal aluminate such as sodium aluminate to the water, while maintaining the presence in the water of a dissolved alkaline earth metal such as calcium. The aluminate will react with the dissolved alkaline earth metal at a pH below about 9 to produce finely divided alumina. This is the most preferred method for forming the water-alumina mixture due to the fact that the particle size of the alumina produced is much smaller than that achieved by the other methods. Since the particle size is smaller, the surface area is greater, thereby enabling a higher degree of adsorption. Moreover, since the aluminate reacts slowly to produce alumina, a so-called reservoir effect may be achieved whereby the alumina is metered out, so to speak, into the body of water to be treated in a colloidal form.

It is especially desirable to maintain the presence of dissolved $CO_2$ in the water to ... ..ance the reaction.

The above-described method is effective at pH's up to about 9. The preferred range, however, is from 6.5 to 8.5. At a pH less than 6.5 the reaction proceeds too fast to enable the formation of finely divided alumina. At a pH above 9 the reaction proceeds too slowly.

(4) The water-alumina mixture may also be formed by electrolysis. By maintaining in the water the presence of an electrolyte such as sodium bicarbonate and electrolyzing the solution at a neutral pH employing an aluminum anode, a finely divided admixture of water and alumina may be obtained.

The amount of alumina dispersed throughout the water will reduce the dissolved phosphate concentration to less than 0.09 p.p.m.

The following non-limiting examples are illustrative of the invention:

EXAMPLE 1

A pond about one acre in area containing algae and other suspended solids in which objects more than one foot below the surface were invisible was treated by mixing therewith with the aid of an outboard motor a 10% sodium aluminate solution in an amount sufficient to yield a concentration of 25 p.p.m.

The pond contained sufficient amounts of dissolved calcium to react with the aluminate to yield finely divided alumina. The pH of the water was maintained below 9 by the periodic addition of 4% sulfuric acid.

The following day a dilute solution of aluminum sulfate was added to the pond to coagulate the colloidal alumina and suspended solids which settled. Within a few days the algae disappeared. The pond was sufficiently clear for objects eight feet below the surface to be clearly visible. The pond remained clear for an additional 6 months.

EXAMPLE 2

An abandoned swimming pool filled with water having a dissolved phosphate concentration slightly above 0.09 p.p.m. was selected for treatment. Algae had grown on the walls of the pool and was floating in the water itself. The water contained dissolved calcium derived from the walls of the pool. The water was dosed with 22 p.p.m. of sodium aluminate and 20 p.p.m. of aluminum sulfate as in Example 1 utilizing the circulation pumps of the pool to achieve agitation.

The floating algae was removed via the sand filtering units of the pool. Algae on the walls died and was easily removed by flushing with water.

It was found that the addition of 10 p.p.m. of sodium aluminate to the pool per week controlled the growth of algae. Approximately 1 p.p.m. of the aluminate reacted with the calcium from the cement walls per day giving rise to a "reservoir" of alumina.

EXAMPLE 3

A pond fed by a domestic sewage stream was found to have a heavy growth of algae. Sodium aluminate was added to the stream supplying the pond at a level of 200 p.p.m. The addition was continued for 2 weeks. The algae was completely destroyed. Following coagulation with aluminum sulfate and settling, the phosphate concentration was found to be 0.01 p.p.m.

I claim:

1. A method for controlling the growth and propagation of algae in a body of water containing dissolved phosphate ion and a dissolved alkaline earth metal, comprising forming an intimate admixture of finely divided alumina with the body of water by mixing an alkali metal aluminate with the body of water, thereby resulting in a reaction between the dissolved alkaline earth metal and the alkali metal aluminate to produce the finely divided alumina, said alumina being present in an amount sufficient to adsorb the dissolved phosphate ion and reduce the concentration thereof as phosphorous in the body of water to less than about 0.09 part per million.

2. The method according to claim 1 comprising removing said finely divided alumina containing said adsorbed phosphate ion from said body of water.

3. The method according to claim 1 wherein the alkaline earth metal is calcium.

4. The method according to claim 1 wherein the pH of the body of water is maintained at up to about 9.

5. The method according to claim 4 wherein the pH of the body of water is maintained at 6.5-8.5.

References Cited

UNITED STATES PATENTS

| | | | |
|---|---|---|---|
| 629,409 | 7/1899 | Wilson | 210—52 |
| 1,513,566 | 10/1924 | Spencer | 71—67 |
| 1,679,777 | 8/1928 | Moberg | 210—52 |
| 2,284,827 | 6/1942 | Lindsay et al. | 210—28 |
| 2,964,466 | 12/1960 | Farnham | 210—52 |
| 3,073,675 | 1/1963 | Leum et al. | 210—37 |
| 3,386,910 | 6/1968 | Forrest | 210—6 |

OTHER REFERENCES

Bogan et al., "Use of algae etc."; (1960) CA 55 p. 4836 (1961).

Mitra, "Phosphates in relation etc."; (1956) CA 52 p. 20413 (1958).

Yee, "Selective removal of mixed phosphates etc."; (1966) CA 64 p. 13917 (1966).

Kar, "Radioactive tracer study etc."; (1958) CA 53 p. 3832 (1959).

Bogoyavlenskii et al., "Investigation of the adsorption etc."; (1960) CA 55 p. 1140 (1961).

Van Vuuren et al., "Removal of algae from waste etc."; (1965) CA 63 pp. 17676-7 (1965).

Dharand et al., "Adsorption of monocalcium phosphates etc."; (1956) CA 52 p. 14918 (1958).

Witt, "Nitrogen and Phosphorus removal from secondary etc."; (1960) Diss. Abst. 20 p. 4618 (1960).

Krauss, "Inorganic nutrition of algae" (1953) Algae Culture From Laboratory to Pilot Plant Carnegie Inst. of Wash. Pub. 600 pp. 85–90. Wash., D.C. QK 565 B9.

Bear, "Toxic elements in Soils" (1957) The Yearbook of Agr. 1957 pp. 165 & 179. S21 A35.

LEWIS GOTTS, Primary Examiner

G. HOLLRAH, Assistant Examiner

U.S. Cl. X.R.

11—65, 66; 210—37, 64